Feb. 4, 1930.  H. G. ROBINSON  1,745,955
WEAVING
Filed Dec. 19, 1925    6 Sheets-Sheet 1

INVENTOR
Harry G. Robinson
BY
ATTORNEY

Feb. 4, 1930.  H. G. ROBINSON  1,745,955
WEAVING
Filed Dec. 19, 1925  6 Sheets-Sheet 3
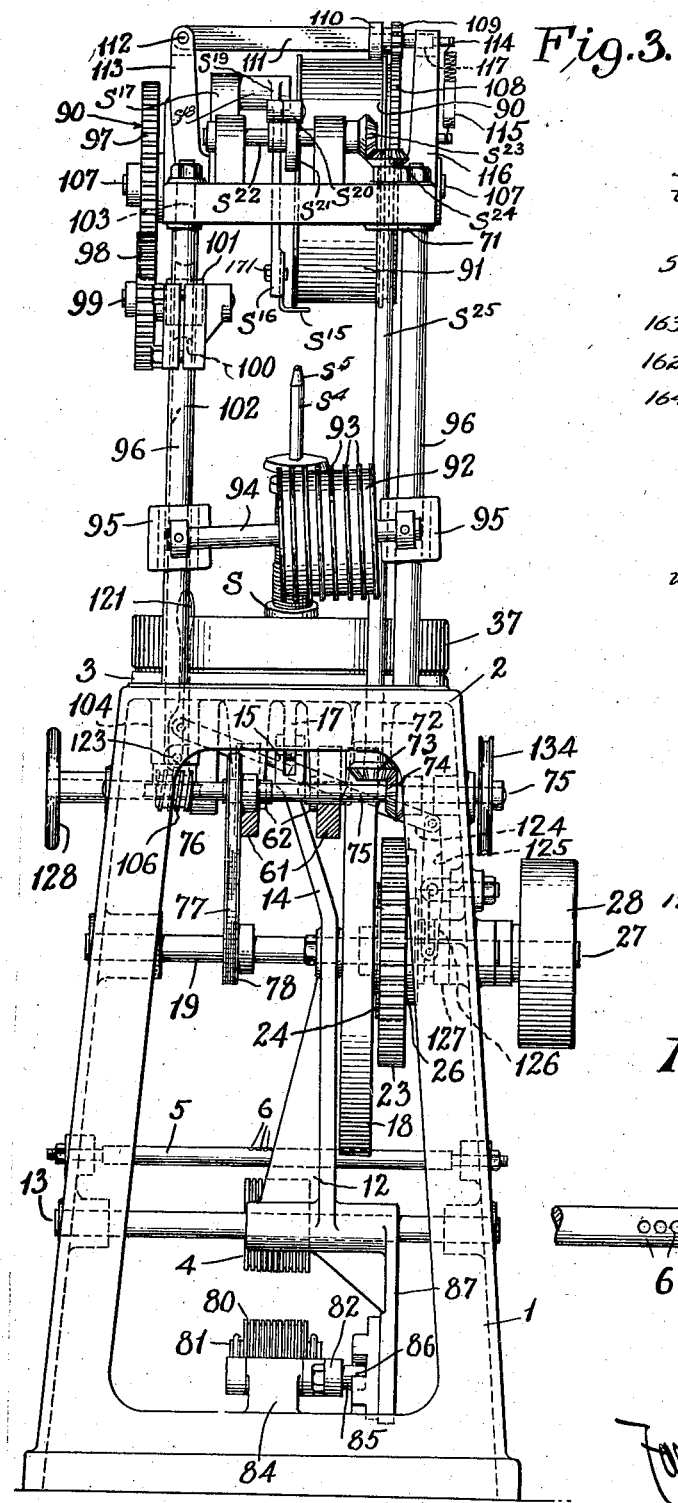
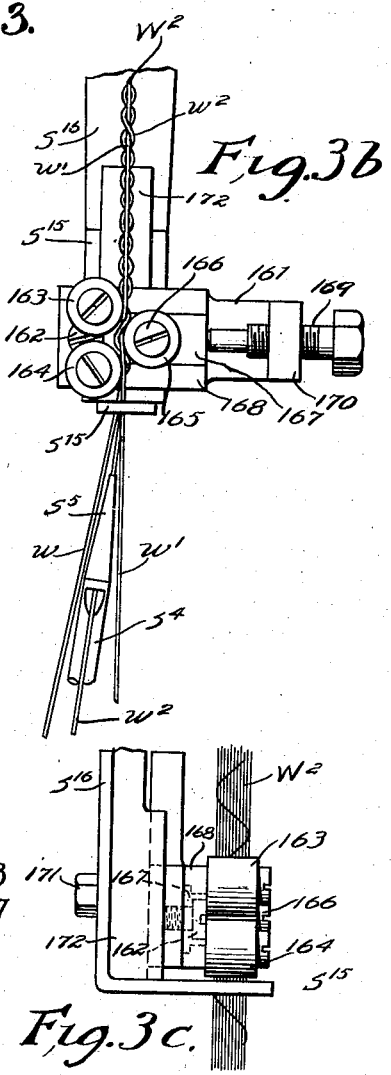
INVENTOR
Harry G. Robinson
BY
ATTORNEY

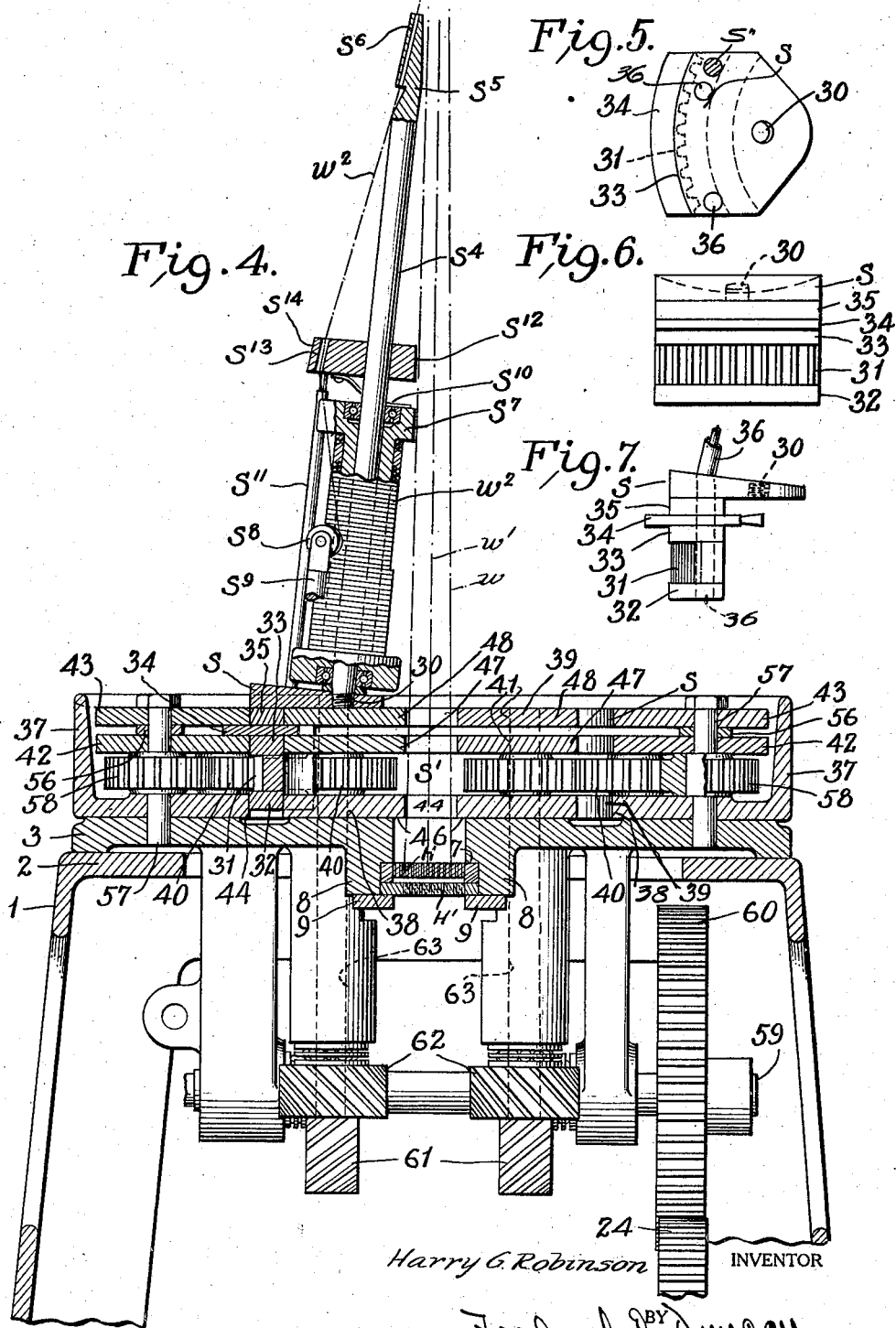

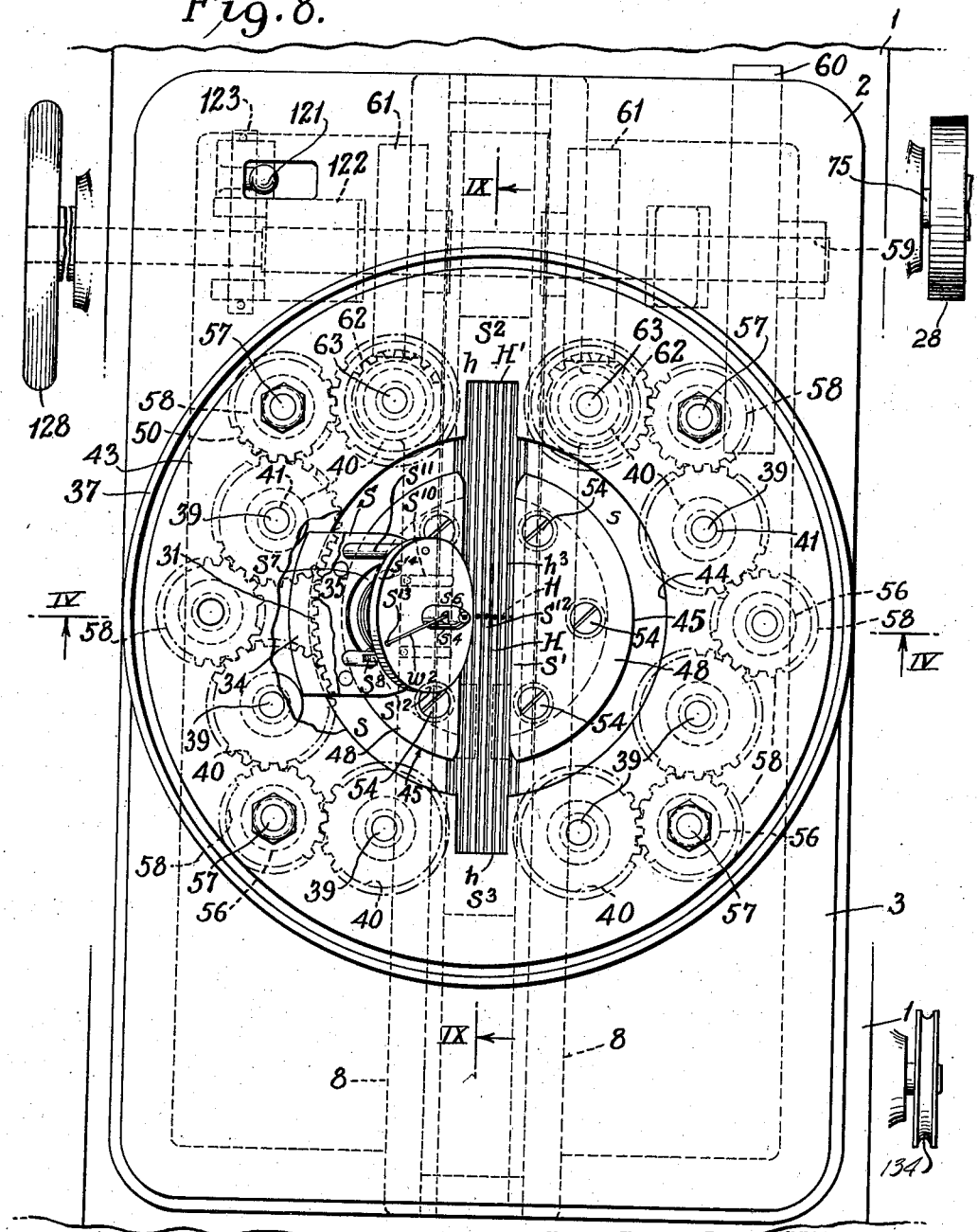

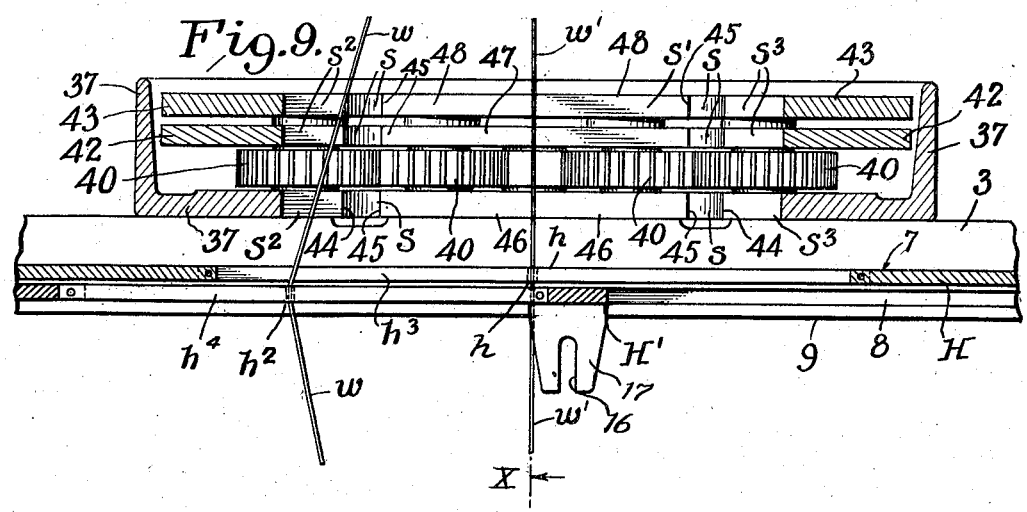
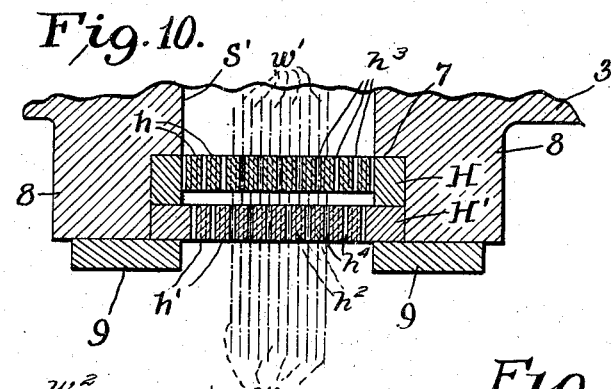
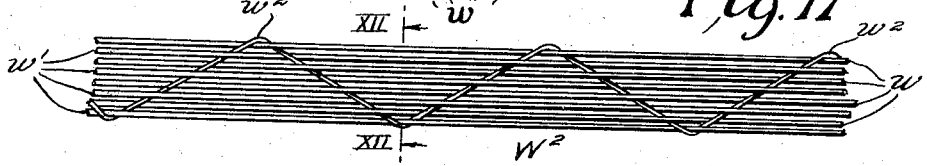
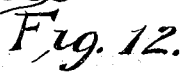
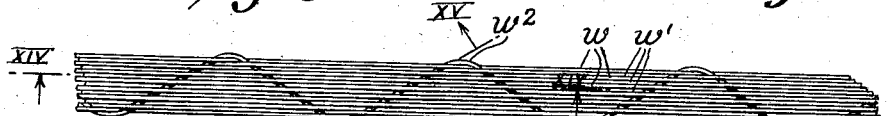
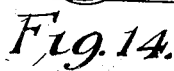
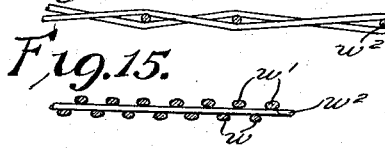

Patented Feb. 4, 1930

1,745,955

UNITED STATES PATENT OFFICE

HARRY G. ROBINSON, OF WATERBURY, CONNECTICUT, ASSIGNOR, BY MESNE ASSIGNMENTS, TO AMERICAN CHAIN COMPANY, INC., A CORPORATION OF NEW YORK

WEAVING

Application filed December 19, 1925. Serial No. 76,431.

This invention relates to looms and is of particular utility when embodied in apparatus for producing flat wire tape of the character used in pneumatic tire beading, although the improvements herein disclosed may be used in any field of the textile art for which they are adapted by their nature.

An important object of the invention is to provide a method of weaving a flat tape or ribbon-like fabric of wire by revolving a filling-carrier around suitably positioned warp strands, and for this purpose to provide a loom with means to form a weaving shed in which certain of the warp strands occupy a central position, forming a group of strands around which a shuttle containing the filling is revolved in a circular or curved path, traveling continuously in the same direction, while other warp strands are shifted bodily back and forth between the strands of the central group and are thus reciprocated diametrically across the path of the shuttle in such a manner that these strands occupy at each end of their traversing movement a position completely outside of the path of the shuttle.

Accordingly, during each complete revolution of the shuttle it passes twice through the sheds thus formed, viz., passing once between the central group of warp strands and the group of strands which have been moved out beyond one side of the circular path of the shuttle, the latter passing again between the central strands and the same group of movable warp strands after the latter have been shifted diametrically across the circular path of the shuttle into a position at the other side completely beyond its path, it being understood that these movable strands are so arranged in conventional staggered relation relatively to the central strands as to permit the revolving shuttle to weave the filling therebetween in the desired pattern as it is paid off from a bobbin carried by the shuttle.

In the formation of flat wire tape for tire beading, the central strands preferably are in one plane, occupying a space corresponding in width to that of the tape being produced; and for the sake of simplicity in structure and operation it is desirable to arrange in another plane the strands composing the movable group, to permit shifting of this movable group of strands by a gang of heddles connected together to form a unitary structure. A cognate object of the invention is to provide the shuttle with a suitable means to lay the filling within the shed close to the region of intersection of the planes of the central warps and movable warps. Such a laying device preferably takes the form of a spindle carried by the shuttle and having a needle point provided with an eye through which the filling passes from the supply bobbin which is mounted on the spindle. This needle preferably travels in a curve which corresponds to the path of the shuttle and therefore describes a circle around the central warps. Accordingly, to avoid interference between the point of the needle and the movable warp strands, as the needle travels in its circular path, which interference might prevent the accurate and regular laying of the filling if the movable threads were left in a plane at that region, I have devised means to spread the movable threads into a curved formation momentarily, at each entry of the needle within the shed, and this curved formation permits the needle to travel freely between the central and movable warps at that region.

I have made further provision for spreading the shed somewhat, for this passage, by means which cause the central strands of the warp to shift slightly away from their central position at the region of laying, so that the central strands and the movable strands are positioned properly with relation to the path of the needle to facilitate free passage of the needle as it lays the filling within the shed. This feature of the invention is of especial importance, accommodating as it does the very stiff wires which are frequently employed in forming tape of this character, and which would be likely to interpose undue resistance to movement of the needle, in the absence of the improvements just referred to.

Another object of the invention is to provide means preferably associated with the above mentioned shed-forming devices, to flatten the completed product as it proceeds from the shed, acting on each throw of weft by the shuttle before the succeeding throw is made.

From the nature of the above arrangement of certain warp strands in a central position, and the necessity of shifting the group of movable strands to a region outside of the path of the shuttle, at each side thereof, the movable strands are necessarily shifted for a considerable distance relatively to the central strands, and during each such shifting movement to one side or the other of the central strands it is desirable to provide means of an unusual character to compensate for the momentary increases in the length of the movable strands relatively to the central strands, and also means to keep the movable strands under constant tension during each of their shifting movements toward the central strands. For this purpose I have devised a novel compensating device which will be described at length hereinafter.

Other objects of this invention comprise improved means for controlling the tension of the warp strands as delivered to the machine, adapted to permit the provision of electrically operated devices to stop the operation of the machine in the event of exhaustion, breakage, entanglement or other interference with the regular supply of any one or more of the warp strands, or of the filling; also improved means for drawing off the completed product; and the object and result of these improvements, individually and in conjunction with each other, and with those already recited, and others which will be made to appear hereinafter, is to provide a process of weaving capable of greatly increased rapidity of action in the loom carrying it into effect, in comparison with certain other processes for performing analogous operations; also to provide for carrying the process into effect by a machine of simpler construction and operation, with greater output, than machines which employ a reciprocating shuttle in the formation of flat wire tape and similar products.

Another object of the invention is to so organize the weaving sheds in an upright position, with the circular path traversed by the shuttle in such close proximity to the central warps, that the mass of filling supply carried by the shuttle will develop a minimum centrifugal and gravitational moment, with the notable result that a large quantity of filling can be utilized without undue strain upon the mechanism, and thus the important advantage is secured that the large filling supply permits a long non-stop run of the machine, with greater economy in production and fewer piecings of the weft.

The various features of this invention will be illustrated and described fully in the accompanying drawings and specification and pointed out in the claims.

In the drawings,

Fig. 1 is a view in side elevation of apparatus for carrying my improvements into effect, including a loom and associated mechanisms in the construction of which the invention has been embodied.

Fig. 1$^a$ is a fragmentary detail view in plan of a portion of the warp-tension mechanism.

Fig. 3 is a rear elevation of the loom.

Fig. 3$^a$ is a fragmentary detail view to be described.

Fig. 3$^b$ is a detail view in elevation, on a larger scale, of an attachment to be applied to the member $s^{10}$ shown in Fig. 3, shown in co-operation with the shuttle.

Fig. 3$^c$ is a rear elevation of the parts shown in Fig. 3$^b$.

Fig. 4 is a fragmentary detail view, on an enlarged scale, in vertical section taken on the line IV—IV of Fig. 8, with the shuttle in the same position as that shown in Fig. 8.

Figs. 5, 6, and 7 illustrate in detail the shuttle, shown separately, being views thereof in plan, front elevation and side elevation, respectively.

Fig. 8 is a plan view of the parts shown in Fig. 4.

Fig. 9 is a fragmentary detail view in vertical section, taken on the line IX—IX of Fig. 8, on an enlarged scale.

Fig. 10 is a sectional view on the line X—X of Fig. 9.

Fig. 11 is a fragmentary, detail view in plan of a portion of a flat wire tape of the character shown under production by the machine herein illustrated, when using the attachment shown in Figs. 3$^b$ and 3$^c$.

Fig. 12 is a transverse section on the line XII—XII of Fig. 11.

Fig. 13 is a fragmentary, detail view in plan of a portion of a wire tape produced by the mechanism shown in Fig. 3, without the attachment shown in Fig. 3$^b$.

Fig. 14 is a section on the line XIV—XIV of Fig. 13.

Fig. 15 is a section on the line XV—XV of Fig. 13.

In the illustrated embodiment is shown a loom comprising a pedestal 1, the upper portion 2 of which constitutes the base for a head 3 in and on which are mounted the principal operating parts of the weaving mechanism of the loom, to be described later in detail.

Figure 1:
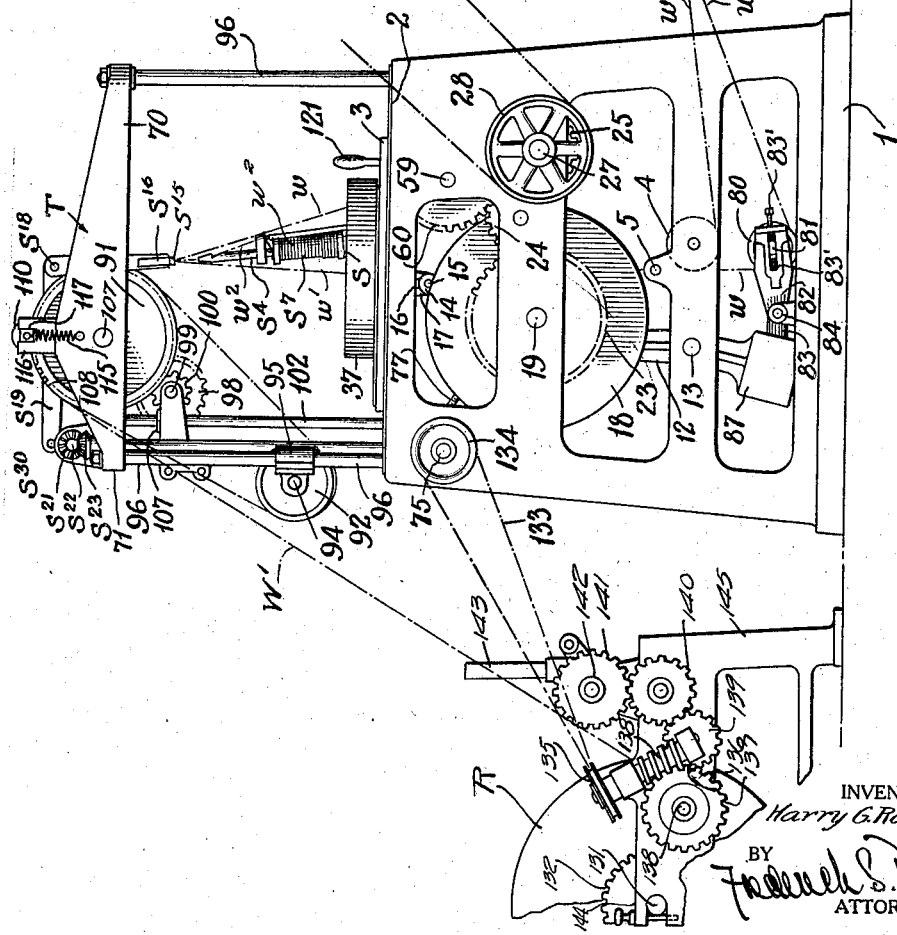

In accordance with the invention, provision is made for supporting a group of warp strands $w^1$ in a central position, occupying a plane transversely of the machine, and of a number and material suitable to the product being formed. The machine is shown as used for production of flat wire tape of the general character shown in Figs. 11 to 15, and the central warp strands $w^1$ are led in from a suitable supply, W, to be hereinafter described briefly, through the bottom of the machine, around a guide roll 4 and upwardly through a guide rod 5 mounted in the frame 1 directly across the middle thereof, having holes 6 shown in Fig. 3a through which the warp strands $w^1$ are led, passing through alternate holes, while the intervening holes serve similarly to guide the warp strands $w$, these constituting a group of movable warp strands which are caused to shift to and fro across the head 3, passing between the warp strands $w^1$ and forming therewith sheds alternately extending toward the front of the machine, as shown in Fig. 1, and then toward the rear thereof. The warp strands $w^1$ pass through holes $h$ (see Fig. 10) in a group H of stationary heddles supported in fixed position against shoulders 7 formed on the head members 3 and extending along a diametrically arranged warp path $s^1$, these heddles being spaced suitably to provide slots $h^3$ therebetween in which the warp strands $w$ are shifted to and fro.

This shifting of the movable group of warp strands may be accomplished in any suitable fashion and by any suitable means, and as the preferred form of such means, I have shown a gang $H^1$ (see Figs. 4, 8, 9, and 10) of heddles $h^1$ connected together to form a unitary structure mounted to slide in ways constituted by the depending portions 8 of the head 3 and by guides 9 bolted thereto. Each of these heddles has a vertical opening $h^2$ at its middle portion, through which passes one of the warp strands $w$, these openings being preferably formed in the same plane, transversely of the gang, and each vertical opening $h^2$ is in alignment with one of the vertical slots $h^3$ between the heddles H. The spaces $h^4$ between the heddles $H^1$ serve to permit passage of the warps $w^1$. The gang $H^1$ is caused to reciprocate lengthwise by means of a lever 12 (see Fig. 2), pivoted upon the frame at 13 and having an arm 14 extending upward into position for engagement by its pin 15 with the walls 16 of a slot formed in a depending bracket 17 mounted upon the lower surface of the heddle frame $H^1$. The lever 12 is actuated by a cam 18 mounted upon a shaft 19 and having a cam groove 20 within which travels a roller 21 carried by a stud 22 at the elbow between the lever 12 and its arm 14. The cam 18 is driven by a chain of gears 23, 24, and 25 of which the last mentioned is preferably formed with one member 26 of a clutch, the other member 26a of the clutch being mounted upon the main driving shaft 27, the latter being operated by a belt running to the driving pulley 28 from a suitable source of power, not shown.

*Revolving shuttle*

In further pursuance of the invention, provision is made of a shuttle S adapted to revolve continuously in a curved orbit, which preferably takes the form of a circular path $s$ (see Fig. 8) concentric with the central group of warp strands $w$ and so disposed relatively to the transverse path $S^1$ of the movable group $w$ of warp strands that when the latter have been moved outwardly by the heddles $h$ to the extremity of their path, as at $s^2$, the shuttle S will, when it is revolved, pass through the shed thus formed, and will thereafter in the course of its continued revolution pass in reverse direction through the shed which has then been formed on the other side of the central group of strands $w^1$ by the shift of the group $w$ of warp strands to the other extremity $s^3$ of their transverse path.

The preferred form of shuttle is shown in Figs. 2, 4, 5, 6, and 7, in which views respectively S designates the head of the shuttle, having a socket 30 in which is fixed preferably a spindle $s^4$ terminating at its free end in a needle $s^5$ having an eye $s^6$ through which the filling strand $w^2$ is led from a ball-bearing bobbin $s^7$ mounted rotatively on the spindle. The shuttle head S surmounts other parts (see Figs. 5, 6, and 7) comprising a segmental rack 31 mounted between slippers 32 and 33; and a guide-plate 34 above which another slipper 35 serves as the direct support for the shuttle head S, these several parts being secured together, as by rivets 36, to form a unitary structure which can be removed from the weaving head as an entity. It constitutes a very strong, compact and inexpensive part of the improved loom illustrated, and is designed to co-operate with the contiguous parts of the raceway in which it runs, and with the actuating devices provided within the head.

This raceway forms the circular path $s$ to which reference has heretofore been made, and is constituted in the instance illustrated by a laminated structure comprising a dished ring 37 mounted on the base 3, and preferably of simple cup-like structure, with its bottom recessed at suitable points 38 (see Fig. 4) to receive a series of trunnions 39 for the gears 40 which serve as driving gears for the shuttle S, meshing with the segmental rack 31 thereon, and operating in a manner to be described more at length hereinafter. The trunnions 39 are extended upwardly to enter bearings 41 in ring-plates 42 and 43. The ring 37 and plates 42 and 43 respectively have central openings 44 whose circular walls constitute the outer walls of the raceway $s$, and the inner walls of this raceway are constituted by the arcuate peripheries 45 of a series of superimposed segmental plates 46, 47 and 48 arranged in stacks spaced apart to form the transverse diametrical path $s^1$ within which the movable group of warp strands $w$ is shifted from side to side, this path being extended by the notches $s^2$ and $s^3$ in the ring-plates 37, 42 and 43 respectively.

The segments 46 rest upon the base 3, and spacers 52, (see Fig. 4), serve to support the segments 47 at the proper height above the segments 46, while similar spacers 53 afford supports to the segments 48, these segmental stacks being respectively secured in place by bolts 54 (see Fig. 8) screwed down through the segments and spacers into suitable threaded sockets in the base 3.

The ring-plate 42 rests upon shoulders on the studs 57 and is thus supported at the proper height.

The ring surface 44 of the member 37, and the opposed periphery 45 of segments 46 form the raceway $s$ for the shuttle slipper 32; the similar surfaces 44 upon the upper ring-plates 42 and 43 and the opposed surfaces 45 on the segments 47 and 48 perform the like office for slippers 33 and 35; while the plate 34 of the shuttle extends outwardly between ring-plates 42 and 43, serving to steady the shuttle at all points in its path, but more particularly to bridge the gaps where the transverse warp path $s^1$ intersects the circular shuttle path $s$. The plate 34 acts also as a spreader to keep the warp strands $w$ from fouling the teeth of the rack 31.

The ring-plate 43 is held above the ring-plate 42 at the proper height to permit free revolution therebetween of the shuttle plate 34, this position of the ring-plate being maintained by the spacers 56 surrounding the trunnions 57 of intermediate gears 58 which serve to connect the driving gears 40 properly for rotation in unison to actuate the shuttle by engagement with its rack 31, which is at all times in mesh with one or more gears 40, even when crossing the gaps $s^2$ and $s^3$. The gears 40 are arranged in two sets of four on each side of the weaving head, being necessarily separated by the aforesaid gaps $s^2$ and $s^3$, so that the invention desirably provides means to drive the two sets of gears in synchronism. The illustrated means for the above purpose comprises a shaft 59 driven by a gear 60 in mesh with the gear 24 on the main shaft 27, and on the shaft 59 are spiral gears 61 engaged with spiral-gears 62 on short vertical counter-shafts 63 on each of which is mounted one of the driving gears 40.

As the shuttle S is thus caused to revolve by the action of the gears 40 upon the segmental rack 31, the filling strand $w^2$ runs from the bobbin $s^7$ over a guide $s^8$ carried by a post $s^9$ mounted on the shuttle head S, the rotation of the bobbin $s^7$ being preferably damped by a spring $s^{10}$ mounted upon a member $s^{12}$ carried by another post $s^{11}$ extending from the shuttle head S, the member $s^{12}$ constituting a spreading device for the warps, and this spreader is pierced at $s^{13}$ by an aperture through which the filling strand $w^2$ is led to the eye $s^6$ of the spindle in such a manner as to keep it from entanglement with the warps as the latter pass from the heddles at the region $s^2$ to the point $s^{15}$ where the shed is completed and where the filling $w^2$ is laid into the shed.

Figure 2:
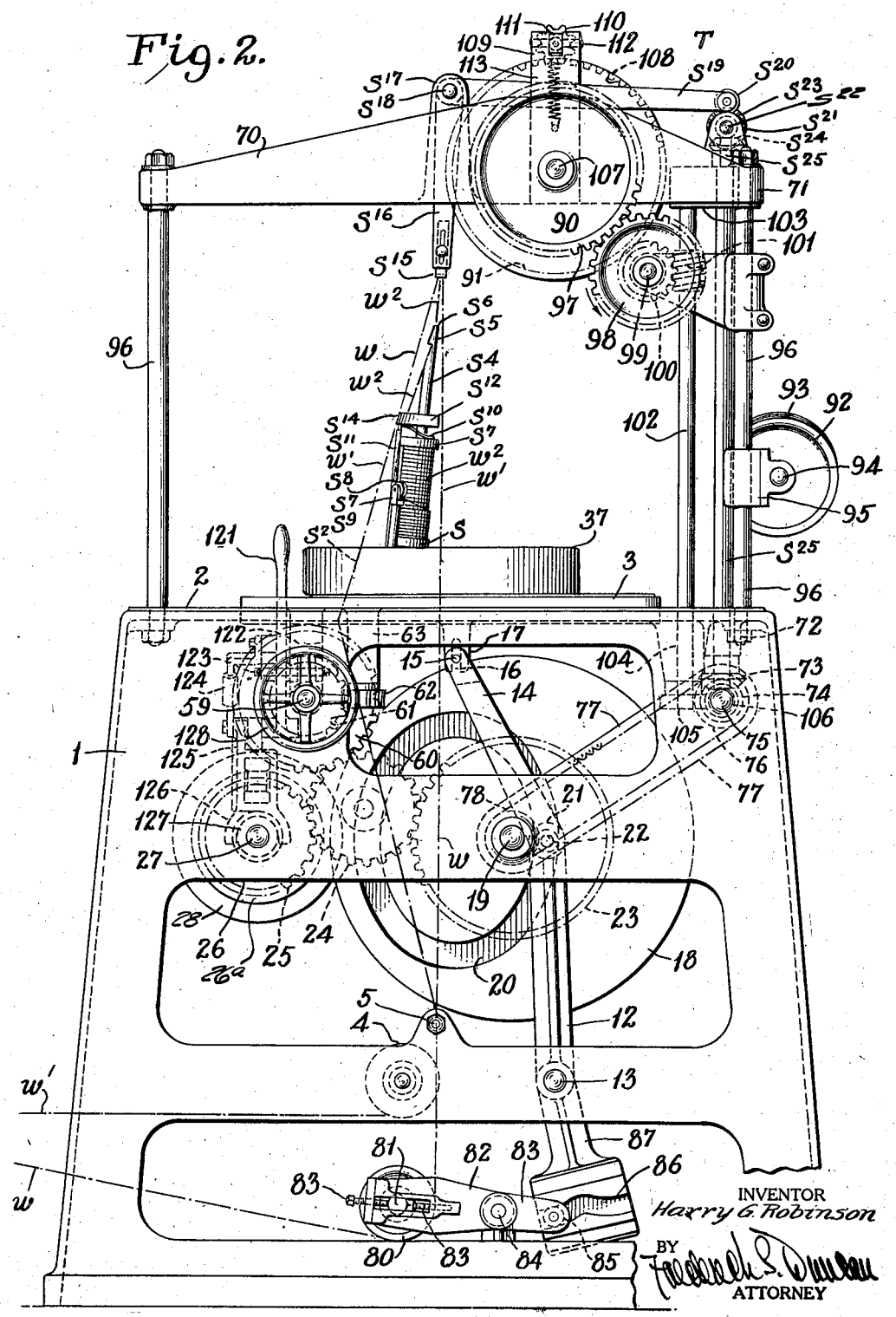
Fig. 2 is a view on an enlarged scale in elevation of said loom taken from the opposite side.

The very stiff character of the wire constituting the warp strands employed in the formation of flat wire beading tape makes it desirable to spread the movable warp strands $w$ out of the plane in which they normally proceed from the heddles so that the warp strands will occupy a curve corresponding approximately with the circular path of the needle $s^5$ as it lays the filling into the shed, and for this purpose the spreader $s^{12}$ is preferably formed with a curved outer periphery at $s^{14}$ which may desirably be a segment of a circle as indicated in Fig. 8, whereby each time that the spindle occupies within the shed a position such as that shown in Figs. 1 and 2 it will spread the warp strands $w$ in arcuate relation to each other and to the needle $s^5$, avoiding any interference with free passage of the needle during the moment of laying the filling $w^2$ in the shed.

As a further improvement in pursuance of the above purpose, means are provided to cause the shed to be opened to a slightly greater extent than would occur if the central warp strands $w^1$ were allowed to remain in a truly vertical position, and accordingly provision is made to cause the central warp strands to swing slightly out of the vertical, thus presenting the shed in a more favorable position to permit passage of the needle $s^5$ as it lays the filling in the shed. Preferably this swinging movement is accomplished by providing an oscillating closing or take-off member $s^{15}$ in the form of a yoke through which the completed tape is led to the take-up mechanism T, (see Fig. 2) and the member $s^{15}$ is shown in Fig. 3 as bolted adjustably at 171 to a pendulum $s^{16}$ mounted pivotally at $s^{17}$ upon the gallows head 70 of the over head portion of the frame, the pendulum $s^{16}$ being fixed upon a rock shaft $s^{18}$ from which extends a lever $s^{19}$ with a friction roller $s^{20}$ engaged with a cam $s^{21}$ upon a counter shaft $s^{22}$, the action of the cam $s^{21}$ being to cause the necessary oscillation of the member $s^{15}$ for the purpose above described. The countershaft $s^{22}$ is actuated by bevel gears $s^{23}$ and $s^{24}$, (see Figs. 2 and 3) the latter being fast upon a vertical shaft $s^{25}$ mounted in bearings 71 and 72 and having at its lower end a bevel gear 73 engaged and driven by a bevel gear 74 upon a countershaft 75 which in turn has a gear 76 driven by a chain 77 running to a gear 78 upon the cam shaft 19, whereby the oscillating movement of the take-off member $s^{15}$ is coordinated accurately with the movement of the heddle gang $H^1$.

On account of the extended path of the heddle $H^1$ and of the gang of warp strands $w$ shifted thereby to each side of the central warp strands $w^1$ as a shed is formed alternately on each side thereof, in reciprocating between the regions $s^2$ and $s^3$, provision is made for taking up the slack of the warp strands $w$ during their return from their extreme outward position toward the plane of the central strands, and for this purpose the warp strands $w$ are led from the source of supply thereof around a grooved roll 80 (see Figs. 2 and 3), mounted adjustably at 81 in a yoke lever 82 provided with set screws 83, the lever 82 being fulcrumed at 84 upon the pedestal 1, and having an arm provided with an antifriction roll 85 which works in a cam groove 86 formed in an arm 87 which constitutes an integral extension of the cam lever 12. The operation of this mechanism insures a positive taking up of the slack in the warp strands $w$ each time that they swing toward the central plane of the warp strands $w^1$ from each side thereof.

Drawing off mechanism

In pursuance of the general object of the invention, which is to furnish a machine that can be operated continuously and steadily with an output much greater than that of certain machines of the reciprocating type, provision is made for taking off the completed product by improved devices which act to withdraw the product under a firm tension that insures the maintenance of the warp strands $w$ taut at all times and which insures also the maintenance of the tape in flat, perfect shape for delivery to a suitable reel on which it may be wound up.

For the above purpose, a convenient form of structure is illustrated, comprising a drum 90 preferably furnished with a jacket 91 of rubber, cork or other yielding material upon which the completed product is delivered from the take-off member $s^{15}$, and on which drum the tape is wound in several convolutions extending over somewhat more than a semi-circumference respectively, but not extending entirely around the periphery of the drum. After passing around the drum 90, the completed tape is led around an idler drum 92 having several peripheral grooves 93 in which the convolutions of tape are held apart from each other and given the necessary direction before being returned to the drum 90, for which purpose the drum 92 is mounted upon a shaft 94 carried by brackets 95 upon the pillars 96 of the frame in approximately the angular position shown. The tape is then delivered from the drum 90 to suitable winding up mechanism illustrated in Fig. 1 and designated generally by the reference character R.

Preferably means will be provided to actuate the drum 90 positively, for which purpose it is shown as having a gear 97 in mesh with a gear 98 upon a shaft 99 provided with a worm gear 100 engaged with a worm 101 upon a vertical shaft 102 mounted in bearings at 103 and 104, the lower end of the shaft 102 having a worm gear 105 driven by a worm 106 upon the countershaft 75. The action of the drum 90 is thus coordinated with that of the other instrumentalities of the machine, and to avoid slippage provision is made for holding the tape firmly against the jacket 91, for which purpose the drum shaft 107 (see Fig. 3) is furnished with a gear 108 which drives a gear 109 upon the hub of a roll 110 mounted rotatably upon a swinging lever 111 fulcrumed at 112 upon a standard 113, and the free end 114 of this lever is normally drawn downward by a spring 115 which acts to press the roll 110 against the last convolution of the tape, aiding the drum to grip the tape and draw it off, the relation of the gears 108 and 109 being such as to permit slight separation thereof without interfering with their positive action. The standard 116 serves to support this spring 115, and has its upper end 117 forked to serve as a guide for the free end 114 of the lever 111.

Winding up mechanism

The completed product $W^1$ may be drawn off from the machine above described by any suitable mechanism and wound up in convenient shape for transportation and use, and for this purpose I have illustrated a form of mechanism which does not require detailed description, as it constitutes a well-known apparatus employed for similar purposes. In the form illustrated it comprises a reel R mounted upon a shaft 131 having a gear 132 adapted to be engaged as shown with an intermediate gear 136 on a countershaft 138, the latter being provided with another gear 137 meshed with a worm 138 which is driven by a friction belt 133 running to its pulley 135 from a pulley 134 on shaft 75, by which the speed of the take-up can be regulated. The gear 137 also actuates a chain of intermediate gears 139, 140, and 141 to rotate the shaft 142 of a distributor 143, the operation of which is well-known, so that it is a sufficient description thereof to say that it lays the successive rows of tape product in proper order upon the barrel of the reel R. The reel shaft 131 is supported removably in the frame member 144 and as the diameter of the tape upon the reel increases the speed of the reel may be lessened by providing for a suitable slip in its actuation. This may take place from a slippage of the friction belt 133 or by means of any other suitable mechanism not shown in detail.

Controlling mechanism

Suitable mechanism is provided to control the operation of the machine, for which purpose I have shown a shipper handle 121 conveniently located, mounted pivotally at 123 (see Figs. 2 and 3) upon a bracket 122 and connected by an adjustable link 124 with a lever 125 provided with a yoke 126 entering a groove in the hub 127 of the clutch member 26 and operating in well-known fashion to throw the clutch into action and out of action. When the clutch is thrown out of action the machine may be operated manually by means of a hand-wheel 128 upon the shaft 59.

Preferably provision is made for stopping the machine automatically in the event of any interruption of the regular delivery of the supplies of warp strands $w$ and $w^1$, and any suitable mechanism may be provided for this purpose, the supplies of wire being preferably introduced to the machine (see Fig. 1) through a tension device 145 comprising sets of rolls 146, 147 and 148 mounted on a suitable standard 149 mounted on the foundation upon which the loom stands. The warps are shown in the instance illustrated as derived from drifts or spools 150 of which there may be as many as are required, and these are supported conveniently upon any suitable creel 151. As one convenient form of mechanism to cooperate with the strand wires in providing proper tension and also in accomplishing stoppage of the loom automatically when desirable, the invention comprises a series of pulleys 152, one for each of the warp strands, each pulley being provided with a coil spring 153 secured upon the base of the frame 149. Each warp strand is led around one of these pulleys, passing therefrom over the direction rolls 147 and thence to the rolls 4 and 80. The rolls 147 are preferably acted upon by spring-controlled retarding devices 154, which cause the rolls 147 to exert sufficient drag on the portions of the warps within the tension device to place the springs 153 under very slight tension. If for any reason any strand wire is not delivered from the creel with desirable regularity, as for example if such a wire becomes kinked or entangled in its drift or such a kink forms in a manner that prevents passage of the wire freely past its spring controlled pulley 152, the tendency of such an obstructed wire will be to lift its pulley against the action of the spring, and the pulley will be drawn upward until it engages a weighted rod 155, mounted on pivoted arms 156 which rise and act as a signal to the operator to stop the loom.

As a further means of control, detector devices, such as the fingers 157, may be provided, which normally permit the wires to run freely beneath them, but which will be raised by the passage of a kink in the wire and are suitably connected to cause stoppage of the loom automatically, as for example by means of electrical circuits, which are not shown, as these do not constitute an essential part of my present invention, and inasmuch as the operation of such stop-motion devices is well understood by those skilled in the art.

Such detectors may also be arranged to stop the loom upon breakage of a warp, or exhaustion of the supply on any of the supply reels.

In Figs. 13, 14, and 15 is shown a part of a wire tape produced by the machine illustrated, in carrying into effect the improved method of weaving herein disclosed, and in this form of the tape the warps $w$ and $w^1$ are laid in close order and the filling $w^2$ occupies substantially a single plane, as indicated in Figs. 14 and 15, the warp threads crossing the said plane in the weave, as illustrated in Fig. 14. This form may be produced by the machine as set forth in Fig. 3.

In Figs. 11 and 12 is shown a form of tape in which the warps $w$ and $w^1$ occupy a single plane and are separated by the thickness of the filling wire $w^2$, which is bent around the warps as illustrated in Fig. 12.

This form of fabric is preferable for some purposes, as for example in a wire tape for tire beading, and its production constitutes a novel and important object of this invention. Any suitable means may be utilized to effect the desired bending of the wire $w^2$ around the warps $w$ and $w^1$, and I have devised an attachment for the loom already described which avails of the relative flexibility of the filling wire $w^2$, as compared with the stiffer warps, to accomplish the bending just after the filling has been laid into the fabric, and I will describe a now preferred form of attachment for this purpose.

In Figs. 3$^b$ and 3$^c$ I have shown a device adapted to operate upon the wire tape W$^2$ progressively as it passes from the closing member $s^{15}$ to the drawing-off drum 90, this device comprising a set of rolls 163, 164, and 165, mounted upon a block 161 carried by the pendulum $s^{16}$ which carries the shed-closing member $s^{15}$ and to which the block is fastened, as by a screw 171.

One roll is preferably adjustable, and for this purpose the roll 165 is secured by a screw 166 upon a slide 167 mounted in ways 168 upon the block 161, and is held in adjusted position by a set-screw 169 mounted in an abutment 170.

The rolls are in suitable position to operate upon the tape W$^2$ in close relation to the closing member $s^{15}$, so that they may effect the requisite bending of the filling $w^2$ as each throw of the latter is laid into the fabric, and before the next throw has been completed, and thus the necessary amount of filling to compensate for the bending may be drawn into place without bending the warps, the rolls serving to hold the filling in its bent position as the weaving proceeds, so that the completed fabric W² preserves the form shown in Fig. 12.

Having described my invention, I claim:—

1. The process of weaving a flat fabric continuously, comprising the continuous revolution of a filling carrier around a centrally disposed group of warps, and the concurrent formation of sheds to receive said filling alternately on one side and on the other of said central warps by shifting a group of movable warps to and fro between the warps of said central group, and advancing said central and movable warps lengthwise to accomplish said continuous weaving.

2. The process of weaving a flat fabric comprising the revolution of a filling carrier continuously in a circular path around a central group of warps through sheds formed alternately by shifting the warps of another group of warps between the warps of said central group.

3. The process of weaving a flat fabric continuously comprising the formation of a plurality of upright sheds by shifting a group of warps to and fro between the warps of a centrally disposed upright group of warps, and in revolving a filling carrier continuously in a circular orbit in close proximity to said central group of warps to lay the filling alternately in the shed formed by the shifting group of warps at one side of the central group and then in the shed formed therebetween at the opposite side of said central group, said central and movable warps being advanced lengthwise, and said movable warps being shifted completely across said orbit, to accomplish said continuous weaving.

4. The process of weaving flat wire tape continuously comprising the continuous revolution of a filling carrier around a centrally disposed group of warps, and the concurrent formation of sheds to receive said filling alternately on one side and on the other of said central warps by shifting a group of movable warps to and fro between the warps of said central group, said central and movable warps being advanced lengthwise, and said movable warps being shifted completely across said orbit, to accomplish said continuous weaving.

5. The process of weaving a flat fabric, continuously, comprising the formation of upright weaving sheds alternately at one side and the other of a centrally disposed upright warp by shifting movable warps to and fro past said central warp and revolving a supply of filling continuously in a circular path passing within said sheds and closely adjacent to said central warp, whereby said supply develops a minimum centrifugal and gravitational moment, said movable warps being shifted completely across the orbit of said filling between successive passages of said filling through said sheds respectively.

6. In the process of weaving a wire fabric, the steps which comprise weaving a filling wire between wire warps, then compressing each throw of filling prior to completion of the next throw to position said warps in the same plane, with said filling wire bent over and under said warps alternately.

7. In a loom, means to form a weaving shed or sheds comprising a centrally disposed warp element and a movable warp element shiftable to form sheds alternately on each side of said central warp element, combined with a shuttle adapted to revolve continuously around said central warp to lay the filling alternately in said sheds, means to shift said movable warp element completely across the orbit of said shuttle, and means to advance said warp elements lengthwise, thereby to fabricate a flat fabric continuously.

8. In a loom, the combination with means adapted to form a weaving shed comprising a centrally disposed group of warps and a group of warps arranged to shift to and fro therebetween, of a shuttle adapted to revolve continuously in a circular path around said central group of warp strands and crossing alternately in reverse directions the transverse path in which said movable group of strands is shifted, the shuttle passing through the shed portions formed respectively first on one side of said central group and then on the other side thereof when said movable group of warps occupies diametrically opposite positions respectively beyond the confines of said circular path of the shuttle, and means to shift said movable group of strands completely across said path.

9. In a loom for weaving wire tape the combination with means adapted to form a weaving shed comprising a centrally disposed group of warps and a group of warps movable to and fro therebetween, of a shuttle adapted to revolve continuously in a circular path around said central group of warps and crossing alternately in reverse directions the transverse path in which said movable group of warps is shifted, the shuttle passing through the shed portions formed respectively first on one side of said central group and then on the other side thereof when said movable group of warps occupies diametrically opposite positions respectively beyond the confines of said circular path of the shuttle, and means to shift said movable group of strands completely across said path.

10. In a loom, means to form a weaving shed or sheds comprising an upright centrally disposed warp or warps and an upright set of warps shiftable therebetween, combined with a shuttle adapted to revolve continuously in a circular path around said central warp and to traverse alternately the sheds formed at one side and the other of said central warp, and means to support said shuttle in an inclined position whereby the resultant thrust of the centrifugal and gravitational moments developed by said revolution is exerted and supported at the base of the shuttle, and means to shift said movable group of strands completely across said path.

11. In a loom, means to form a weaving shed or sheds comprising a centrally disposed warp or warps and a set of warps shiftable therebetween, combined with a shuttle adapted to revolve continuously in a circular path around said central warp and to traverse alternately the sheds formed at one side and the other of said central warp, said shuttle having a laying member extending closely adjacent to the region at which the filling is laid in the shed.

12. In a loom, means to form a weaving shed or sheds comprising a centrally disposed warp or warps and a set of warps shiftable therebetween, combined with a shuttle adapted to revolve continuously in a circular path around said central warp and to traverse alternately the sheds formed at one side and the other of said central warp, said shuttle having a laying member extending closely adjacent to the region at which the filling is laid in the shed, and means to conform said warps to the circular path of said laying member.

13. In a loom, means to form a weaving shed or sheds comprising a centrally disposed warp or warps and a set of warps shiftable therebetween, combined with a shuttle adapted to revolve continuously in a circular path around said central warp and to traverse alternately the shed formed at one side and the other of said central warp, said shuttle having a laying member extending closely adjacent to the region at which the filling is laid in the shed, and means to conform said warps to the circular path of said laying member, said means acting to shift the shed formed by said central warps and other warps from the central position toward the path followed by the laying member at the laying periods respectively.

14. In a loom for weaving flat fabric, means to form a weaving shed or sheds comprising a centrally disposed flat set of warps and a flat set of warps shiftable therebetween, combined with a shuttle adapted to revolve continuously in a circular path around said central warps and to traverse alternately the sheds formed at one side and the other of said central warps, said shuttle having a laying member describing a circular path at the laying region, and means to shift said central warps from their central position toward the path of said laying member at the laying region of said shed, during the laying periods respectively.

15. In a loom for weaving flat fabric, means to form a weaving shed or sheds comprising a centrally disposed flat set of warps and a flat set of warps shiftable therebetween, combined with a shuttle adapted to revolve continuously in a circular path around said central warps and to traverse alternately the sheds formed at one side and the other of said central warps, said shuttle having a laying member describing a circular path at the laying region, and means to shift said central warps from their central position toward the path of said laying member at the laying region of said shed, during the laying periods respectively, said shifting means including an oscillating shed-closing member.

16. In a loom, means to form a weaving shed or sheds comprising a centrally disposed warp or warps and a set of warps shiftable therebetween, combined with a shuttle adapted to revolve continuously in a circular path around said central warp and to traverse alternately the sheds formed at one side and the other of said central warp, said shuttle having a spreading device adapted to conform said shiftable warps to the circular path followed by said shuttle at the periods of laying respectively.

17. In a loom, means to form a weaving shed or sheds comprising a centrally disposed warp or warps and a set of warps shiftable therebetween, combined with a shuttle provided with a rack and slippers and adapted to revolve continuously in a circular path around said central warp and to traverse alternately the sheds formed at one side and the other of said central warp, and a weaving head having a series of plates arranged to form a track for said slippers, said head having a set of actuating gears disposed around said path in position to engage said rack on said shuttle.

18. In a loom, a weaving head comprising a base, a series of plates mounted in spaced relation thereupon and arranged to form a curved shuttle track and a transverse warp track, heddles carried by said head and means to actuate said heddles to operate the warps, a shuttle having means to engage said curved shuttle track and having also a rack, and gears carried by said head and adapted to engage said rack, thereby to cause said shuttle to revolve in said track.

19. A shuttle for looms of the class described, said shuttle comprising a shuttle base provided with an upright spindle adapted to receive a filling bobbin, and said shuttle base having upon the side opposite said spindle and below the level thereof a curved rack adapted to be engaged and operated by actuating gears.

20. A shuttle for looms of the class described, said shuttle comprising a shuttle base provided with a spindle adapted to receive a filling bobbin, and said shuttle base having upon the side opposite said spindle a curved rack adapted to be engaged and operated by actuating gears, and a guide plate and slippers to be engaged by guides on the loom.

21. A shuttle for looms of the class described, said shuttle comprising a shuttle base provided with a spindle adapted to receive a filling bobbin, said spindle having a needle point with an eye extending co-axially therewith to lay the filling running from said bobbin, and a filling guide carried by said base, to direct the filling from said bobbin to said eye.

22. A shuttle for looms of the class described, said shuttle comprising a shuttle base provided with a spindle adapted to receive a filling bobbin, said spindle having an eccentrically shaped warp spreader extending radially therefrom, said warp spreader being mounted on a post carried by said base.

23. A shuttle for looms of the class described, said shuttle comprising a shuttle base provided with a spindle adapted to receive a filling bobbin, said spindle having an eccentrically shaped warp spreader extending radially therefrom, and mounted eccentrically upon said spindle.

24. A shuttle for looms of the class described, said shuttle comprising a shuttle base provided with a spindle adapted to receive a filling bobbin, said spindle having an eccentrically shaped warp spreader extending radially therefrom, and mounted eccentrically upon said spindle, having a guide opening for the filling.

25. A shuttle for looms of the class described, said shuttle comprising a shuttle base provided with a spindle adapted to receive a filling bobbin, said shuttle base having upon the side opposite said spindle a rack and guide slippers, and said spindle having an eccentrically formed and eccentrically disposed warp spreader with a guide opening for the filling running from said bobbin.

26. A shuttle for looms of the class described, said shuttle comprising a shuttle base provided with a spindle adapted to receive a filling bobbin and having a needle point with an eye to lay the filling running from said bobbin, an eccentrically formed and eccentrically disposed warp-spreader on said spindle between said bobbin and eye; and a rack and guide slippers mounted on said base on the side opposite said spindle.

27. A shuttle for looms of the class described, said shuttle comprising a shuttle base provided with a spindle adapted to receive a filling bobbin and having a needle point with an eye to lay the filling running from said bobbin, an eccentrically disposed warp-spreader on said spindle between said bobbin and eye; and separately formed guide plate, rack and guide slipper members mounted on said base on the side opposite said spindle, said shuttle being adapted to revolve in a plane parallel with said base, and said spindle being supported by said base in an angular position with its axis directed toward the axis of revolution of said shuttle.

In testimony whereof, I have signed this specification.

HARRY G. ROBINSON.